United States Patent
Chen

(10) Patent No.: US 12,146,547 B2
(45) Date of Patent: Nov. 19, 2024

(54) VARIABLE DAMPING SHOCK ABSORBER

(71) Applicant: MARTAS PRECISION SLIDE CO., LTD., New Taipei (TW)

(72) Inventor: Wan-Lai Chen, New Taipei (TW)

(73) Assignee: MARTAS PRECISION SLIDE CO., LTD., New Taipei (TW)

( * ) Notice: Subject to any disclaimer, the term of this patent is extended or adjusted under 35 U.S.C. 154(b) by 357 days.

(21) Appl. No.: 17/746,982

(22) Filed: May 18, 2022

(65) Prior Publication Data

US 2023/0375064 A1    Nov. 23, 2023

(51) Int. Cl.
| F16F 9/19 | (2006.01) |
| A47B 88/47 | (2017.01) |
| A47B 88/477 | (2017.01) |
| F16F 7/09 | (2006.01) |
| F16F 9/32 | (2006.01) |

(52) U.S. Cl.
CPC ............. *F16F 9/19* (2013.01); *A47B 88/477* (2017.01); *F16F 7/09* (2013.01); *F16F 9/3242* (2013.01)

(58) Field of Classification Search
CPC .... F16F 9/19; F16F 7/09; F16F 9/3242; F16F 9/366; F16F 9/348; B60G 13/08; B60G 2202/24; A47B 88/477
See application file for complete search history.

(56) References Cited

U.S. PATENT DOCUMENTS

| 2,771,968 | A | * | 11/1956 | Mercier | F16F 9/20 137/493 |
| 2,783,039 | A | * | 2/1957 | Wilson | F16F 3/04 280/486 |
| 3,131,921 | A | * | 5/1964 | Karbowniczek | F16F 9/20 267/128 |
| 3,866,724 | A | * | 2/1975 | Hollnagel | F16F 7/09 267/209 |
| 4,372,545 | A | * | 2/1983 | Federspiel | F16F 9/512 267/221 |
| 4,615,420 | A | * | 10/1986 | Mourray | F16F 9/348 137/493.9 |
| 4,729,458 | A | * | 3/1988 | Bauer | F16F 9/54 24/453 |

(Continued)

FOREIGN PATENT DOCUMENTS

| TW | I225533 | 12/2004 |
| TW | M329092 | 3/2008 |

*Primary Examiner* — Bradley T King
*Assistant Examiner* — James K Hsiao
(74) *Attorney, Agent, or Firm* — Fei-hung Yang

(57) ABSTRACT

A variable damping shock absorber includes a housing, a piston rod, two piston blocks, a first elastic element, a conical seat and a second elastic element. The two piston blocks are spaced and fixed to an end of the piston rod; the conical seat is installed between the two piston blocks; the first elastic element is installed between a closed end of the housing and one of the piston blocks; the second elastic element is installed between the conical seat and the other piston block; and a conical surface is formed at the middle part of the conical seat and sheathed with at least one third piston rubber ring. After the first elastic element and the third piston rubber ring are pressed to squeeze a surface of the conical seat and the housing to produce friction, different damping effects can be achieved by different strengths of exerted forces.

6 Claims, 6 Drawing Sheets

(56) References Cited

U.S. PATENT DOCUMENTS

| | | | | |
|---|---|---|---|---|
| 4,877,226 A * | 10/1989 | Taylor | F16F 9/3207 188/322.22 |
| 4,955,467 A * | 9/1990 | Kallenbach | F16F 7/09 188/134 |
| 4,973,077 A * | 11/1990 | Kuwayama | B60G 21/0553 280/5.511 |
| 5,133,435 A * | 7/1992 | Taylor | F16F 7/09 188/129 |
| 5,984,058 A * | 11/1999 | Danneker | B61K 7/02 293/30 |
| 6,007,057 A * | 12/1999 | Fuhrmann | E05F 3/02 188/282.1 |
| 6,290,038 B1 * | 9/2001 | Jensen | F16F 7/09 267/134 |
| 6,702,266 B1 * | 3/2004 | Dec | F16H 7/1218 267/202 |
| 6,814,193 B2 * | 11/2004 | Grundei | F16F 9/061 188/322.22 |
| 7,387,181 B2 * | 6/2008 | Adoline | F16F 9/0254 267/195 |
| 7,467,787 B2 * | 12/2008 | Adoline | F16F 3/04 267/168 |
| 7,677,539 B2 * | 3/2010 | Adoline | F16F 13/007 267/168 |
| 8,245,823 B2 * | 8/2012 | Zeissner | F16F 9/3485 188/322.22 |
| 8,292,274 B2 * | 10/2012 | Adoline | F16F 9/0218 267/168 |
| 8,939,215 B2 * | 1/2015 | McMiles | E21B 41/0007 166/344 |
| 8,978,845 B2 * | 3/2015 | Kim | F16F 9/5126 188/313 |
| 9,091,320 B1 * | 7/2015 | Smith | F16F 9/48 |
| 9,493,974 B2 * | 11/2016 | Ng | E05F 5/02 |
| 9,500,255 B2 * | 11/2016 | Nowaczyk | F16F 9/512 |
| 9,541,153 B2 * | 1/2017 | Park | F16F 9/3405 |
| 9,546,707 B2 * | 1/2017 | Kus | F16F 9/48 |
| 9,598,889 B2 * | 3/2017 | Löhken | F16F 13/005 |
| 9,611,915 B2 * | 4/2017 | Park | F16F 9/5126 |
| 9,834,054 B2 * | 12/2017 | Teraoka | F16F 9/5126 |
| 10,625,551 B2 * | 4/2020 | Rumpel | B60G 7/003 |
| 10,683,906 B2 * | 6/2020 | Kus | F16F 9/49 |
| 10,962,081 B2 * | 3/2021 | Sankaran | B60G 13/08 |
| 2012/0248670 A1 * | 10/2012 | Yamashita | F16F 9/49 267/226 |
| 2015/0159727 A1 * | 6/2015 | Park | F16F 9/5126 188/280 |
| 2015/0204411 A1 * | 7/2015 | Kus | F16F 9/3488 188/313 |
| 2015/0337586 A1 * | 11/2015 | Lohken | F16F 7/09 267/140.13 |
| 2016/0288604 A1 * | 10/2016 | Teraoka | B60G 13/08 |
| 2018/0156302 A1 * | 6/2018 | Kus | F16F 9/585 |
| 2019/0162266 A1 * | 5/2019 | Flacht | F16F 9/18 |
| 2019/0375263 A1 * | 12/2019 | Knapczyk | B60G 17/08 |
| 2020/0011395 A1 * | 1/2020 | Sankaran | F16F 9/49 |
| 2020/0128960 A1 * | 4/2020 | Goetz | A47B 88/477 |
| 2021/0000255 A1 * | 1/2021 | Chen | A47B 88/463 |
| 2021/0070130 A1 * | 3/2021 | Cheong | F16F 9/368 |
| 2023/0235806 A1 * | 7/2023 | Cho | F16F 9/5126 188/322.5 |

* cited by examiner

VARIABLE DAMPING SHOCK ABSORBER

BACKGROUND

Technical Field

This disclosure relates to the technical field of shock absorbing devices for a slide rail. More particularly, this disclosure relates to a variable damping shock absorber installed in the slide rail for buffering the force produced when a drawer drives the slide rail to retreat, and its variable damping design can provide different buffering effects based on in different forces exerted on the slide rail.

Description of Related Art

In order to facilitate the opening or closing of the drawer in the furniture, slide rails are usually installed and used to improve the labor-saving effect when opening or closing the drawer. In addition, a drawer interlocking function, an automatic closing and buffering function when closed, and an automatic closing/buffering function that combines the automatic closing and buffering functions are generally added to the slide rail to improve the convenience and safety of use. Among these functions, the buffering function is a very important one that can avoid structural damages to the slide rail and reduce collisions and abnormal noises during use. In this function, a buffer is used to provide resistance to resist a reverse movement in order to control the last-stage speed of the retraction of the slide rail. If the drawer can be closed automatically and slowly, it will not make loud noises or cause damages to the structure of the drawer or slide rail. At present, the common buffers on the market are mainly divided by the source of the internal buffering resistance into two types: pneumatic type and hydraulic type, which use the compressibility of the volume of a gas or liquid to achieve the effect of buffering resistance.

However, the biggest problem of these two kinds of buffers resides on oil leakage or air leakage. Although manufacturing technologies advance, the problem of oil leakage or air leakage can be overcome. However, the consumable parts of the buffer structure will still cause the occurrence of elastic fatigue or wear due to prolonged use, thereby resulting in oil leakage, air leakage and other problems. These problems can be solved by replacing the consumables and replenishing fluids, etc., but it will still cause great inconvenience in use and operation.

In the structure of a hydraulic shock absorber (which is taken as an example for illustrating this disclosure), a small gap is formed around the periphery of a piston block of a shaft rod for passing a hydraulic oil when the shaft rod is pulled or pushed, so that the shaft rod can maintain its slow sliding state effectively. However, the hydraulic oil has a physical property that the volume of fluid cannot be compressed, so that it will generate a large buffer resistance, which will lengthen the time of restoring the slide rail structure and may cause the slide rail structure unable to be fully retracted due to the excessive buffer resistance and the interference to the pull-back action by the resistance. Therefore, it is necessary to use other resilient structures to restore the slide rail structure, otherwise the pull-back force will gradually be weakened and the elasticity will become fatigue after a long time of use, and definitely will affect the automatic restoring function of the slide rail. As disclosed in R.O.C. Patent No. 1225533 and Utility Model No. M329092, a rubber damping device is provided for rubbing the inner wall of a hollow tube body to obtain the required buffer resistance in order to omit the use of a conventional buffer fluid (including gas and liquid). However, this method is used for fixed resistance only, but cannot be used to provide different buffer resistances for the slide rail structure exerted with variable forces, and such method definitely requires further improvements.

In view of the aforementioned drawbacks, the present disclosure provides a variable damping shock absorber, which is unlike a common slide rail buffer that only uses gas, damping oil, elastic element, or rubber to provide a fixed damping effect and fails to change the outputted damping effect when the load carried by the drawer or the applied force (pressure) for closing the drawer varies. The fixed damping method cannot meet the actual operation requirements. On the other hand, the special design of this disclosure can overcome the shortcomings of the conventional slide rail and can provide different damping outputs and effects for different exerted forces to meet actual operation requirements.

SUMMARY

Therefore, it is a primary objective of the present disclosure to provide a variable damping shock absorber including a housing, a piston rod, two piston blocks, a first elastic element, a conical seat and a second elastic element, and a conical surface is formed at the middle part of the conical seat and movably sheathed with at least one third piston rubber ring, such that an additional damping effect is added in the fixed damping operation provided by the original first elastic element, so that different damping effects for different exerted forces can be achieved to meet the actual operation requirements.

To achieve the aforementioned and other objectives, the present disclosure discloses a variable damping shock absorber provided to be quickly installed into a slide rail for buffering a force when the force is exerted on the slide rail to retract the slide rail inward. The variable damping shock absorber includes: a housing, being a round tubular thin shell structure, and having two ends recessed inwards to form a ring rim provided for installing two stop blocks, and each stop block having a through hole formed at the center of the stop block; a piston rod, having two ends defined as a first end and a second end respectively, and the first end being movably installed in the housing, and the second end being extended to and exposed from the housing for the purpose of an external connection; two piston blocks, including a first piston block and a second piston block, and the first piston block having the first end disposed at the piston rod, and the second piston block being spaced from the piston rod on a side of the first piston block, and a first piston rubber ring being installed between the first piston block and the inner wall of the housing to form an airtight seal, and a second piston rubber ring being installed between the second piston block and the inner wall of the housing to form an airtight seal; a first elastic element, installed between an end of the housing and the first piston block, such that the piston rod when not being forced will be extended to the outside by the resilience of the first elastic element; a conical seat, movably installed between the first piston block and the second piston block, and having a conical surface formed at the middle part of the conical seat and configured to be correspondsive to the moving direction of the piston rod; at least a third piston rubber ring movably sheathed on the conical surface, such that the third piston rubber ring can move on the conical surface with the relative displacement of the piston rod; and a second elastic element, installed between the conical seat and the second piston block, for abutting the conical seat against the first piston block by the resilience of the second elastic element; thereby, when an exerted pressure increases, the third piston rubber ring moves to a position where a surface of the conical seat is closest to the inner surface of the housing, and squeezes the inner surface of the housing to increase friction and achieve the effect of enhancing a damping effect.

In an embodiment, the length of first elastic element is pre-pressed, which is equivalent to the length of the housing minus the distance from the first piston block to the second piston block, and the length of the second elastic element is pre-pressed, which is equivalent to the spacing between the first piston block and the second piston block minus the length of the conical seat.

In another embodiment of this disclosure, a first fixing hole is formed at the center of the first piston block and configured to be corresponsive to the piston rod, a second fixing hole is formed at the center of the second piston block and configured to be corresponsive to the piston rod, a first ring groove is formed around the periphery of the first piston block and configured to be corresponsive to the first piston rubber ring, and a second ring groove is formed around the periphery of the second piston block and configured to be corresponsive to the second piston rubber ring. It is noteworthy that the conical surface of the conical seat has a predetermined included angle relative to the moving direction of the piston rod, and the predetermined included angle falls within a range of 60 degrees~75 degrees.

DESCRIPTION OF THE EMBODIMENTS

The accompanying drawings are included to provide a further understanding of the disclosure, and are incorporated in and constitute a part of this specification. The drawings illustrate embodiments of the disclosure and the description of the specification serves to explain the principles of the disclosure.

Figure 1:
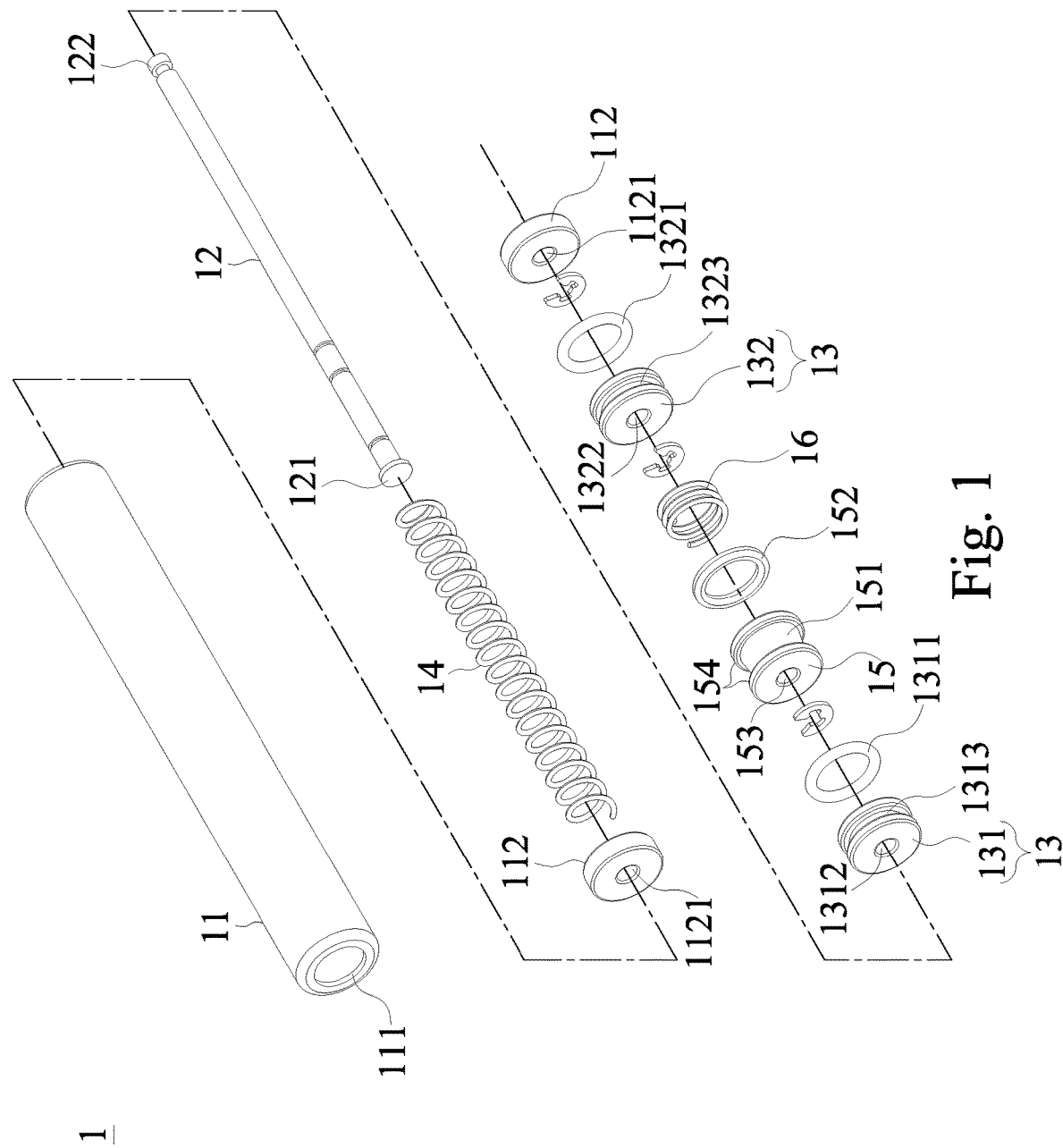
FIG. 1 is an exploded view of a preferred embodiment of this disclosure.
Figure 2:
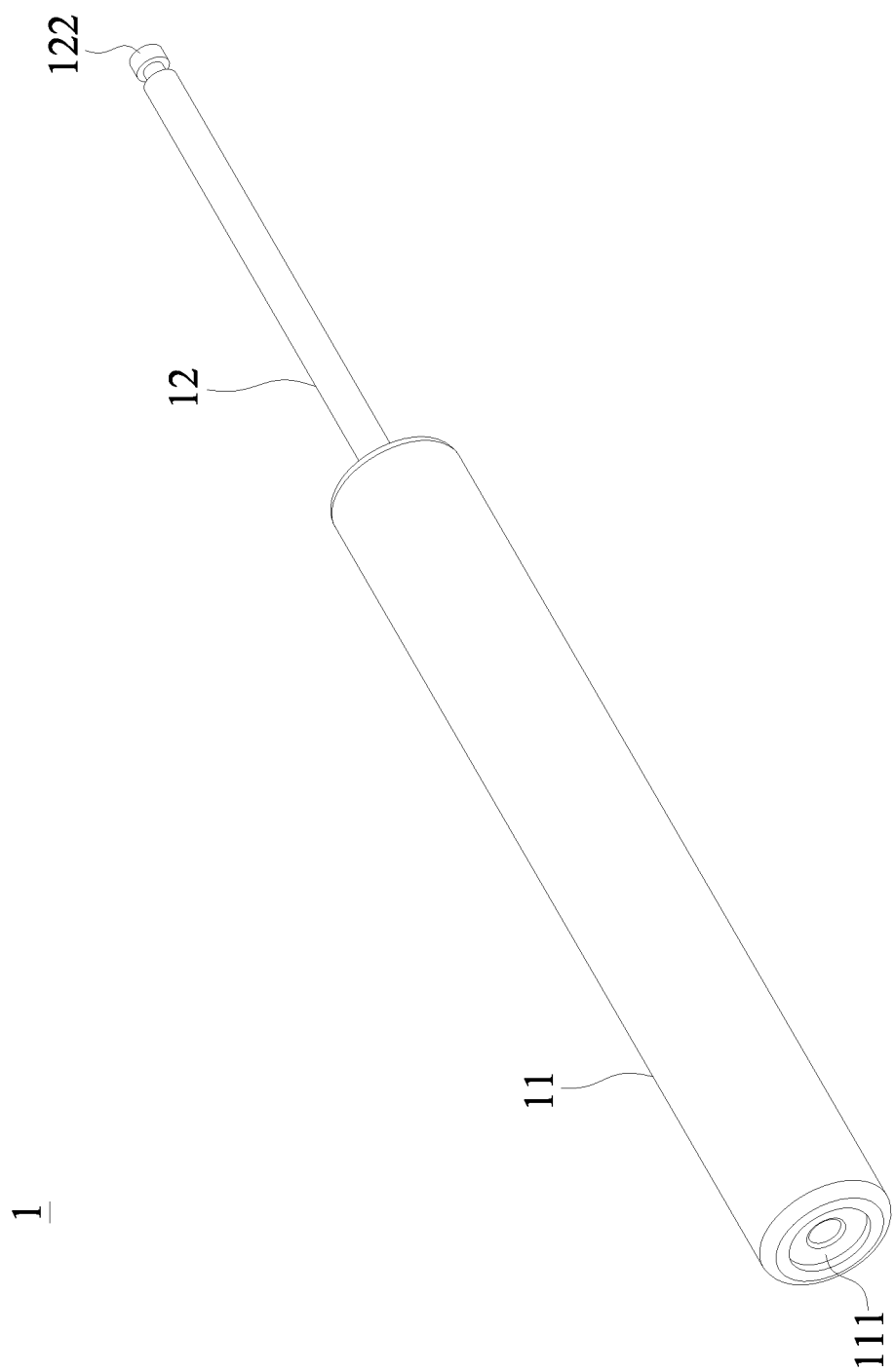
FIG. 2 is a perspective view of a preferred embodiment of this disclosure.
Figure 3:
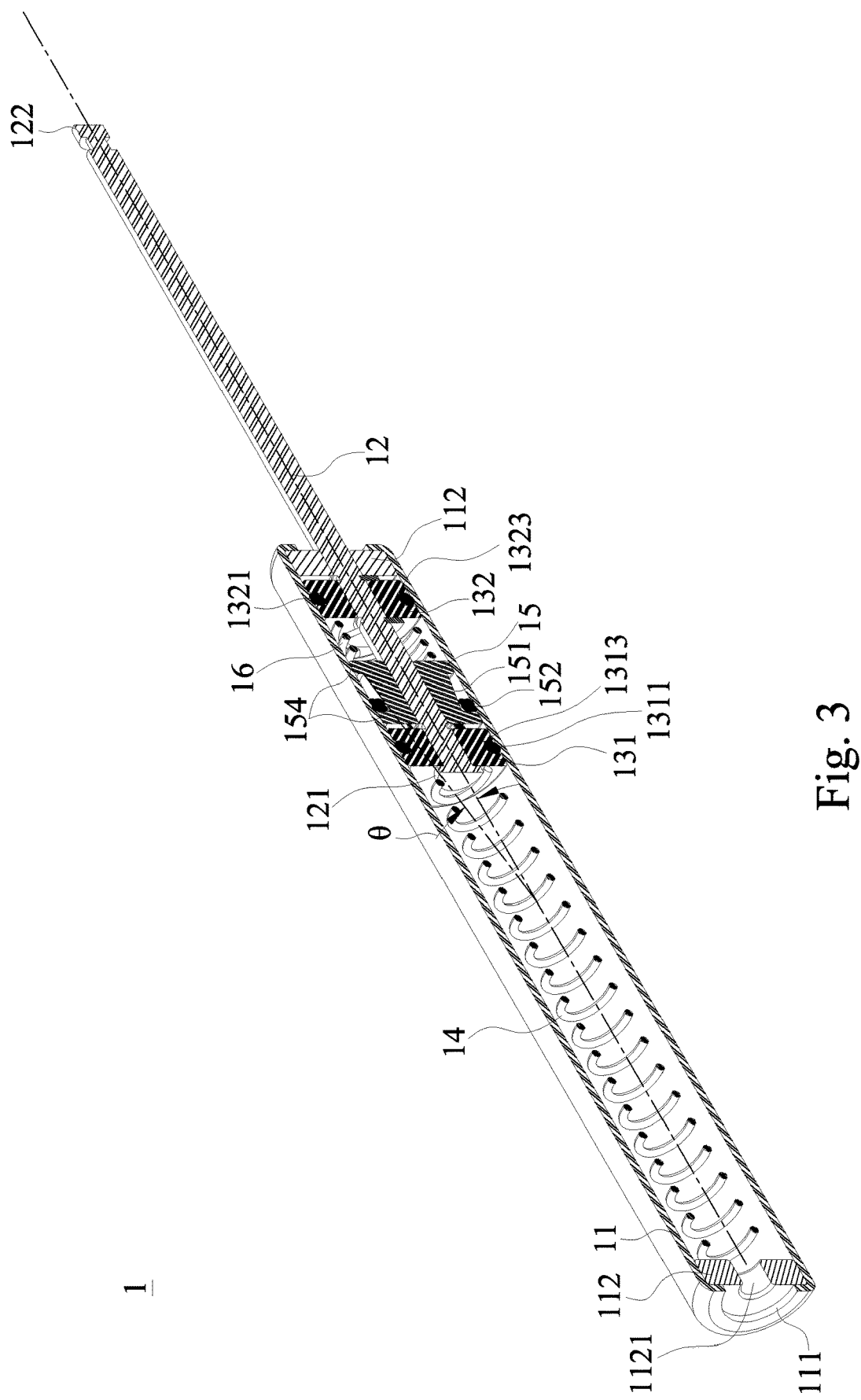
FIG. 3 is a cross-sectional view of a preferred embodiment of this disclosure.
Figure 4:
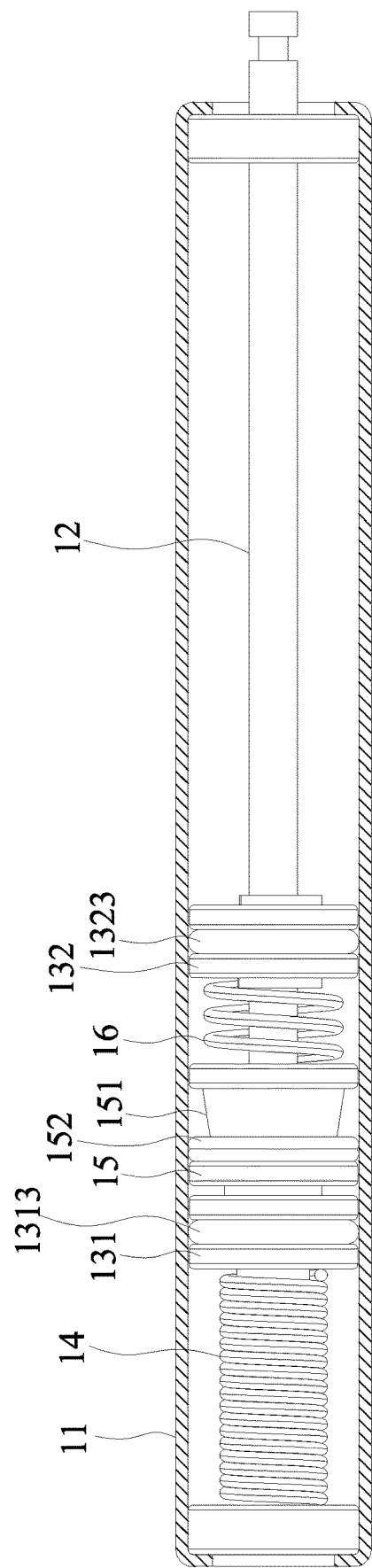
FIG. 4 is a first schematic view showing the status of an operation in accordance with a preferred embodiment of this disclosure.
Figure 5:
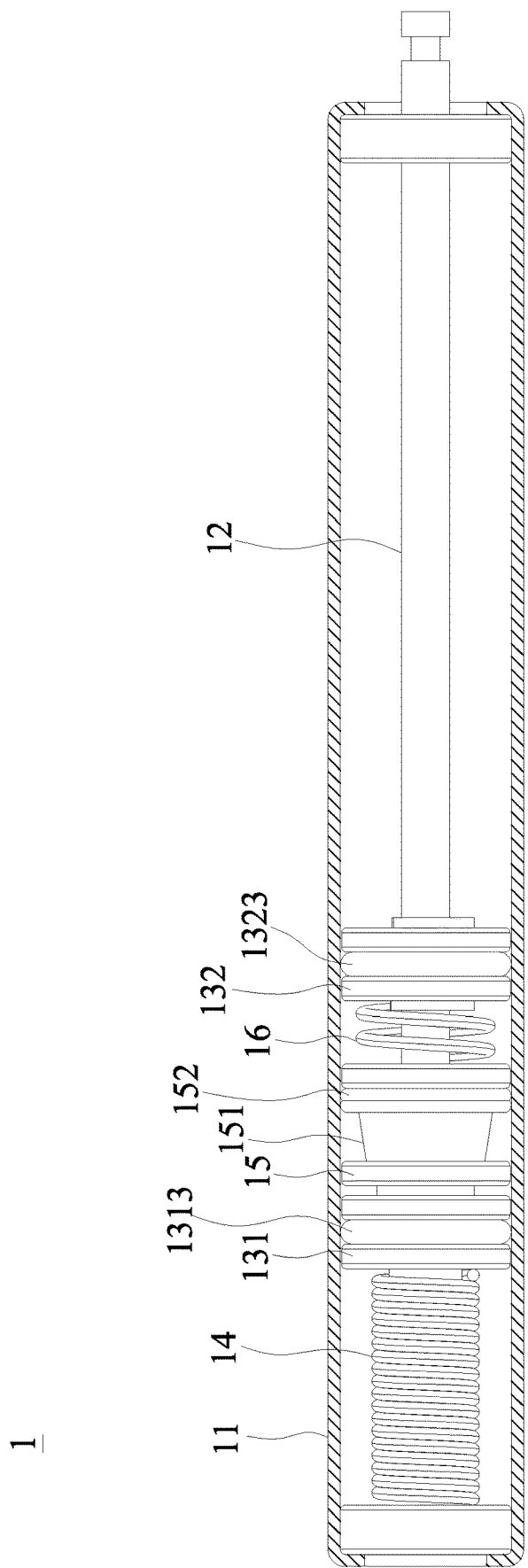
FIG. 5 is a second schematic view showing the status of the operation in accordance with a preferred embodiment of this disclosure.
Figure 6:
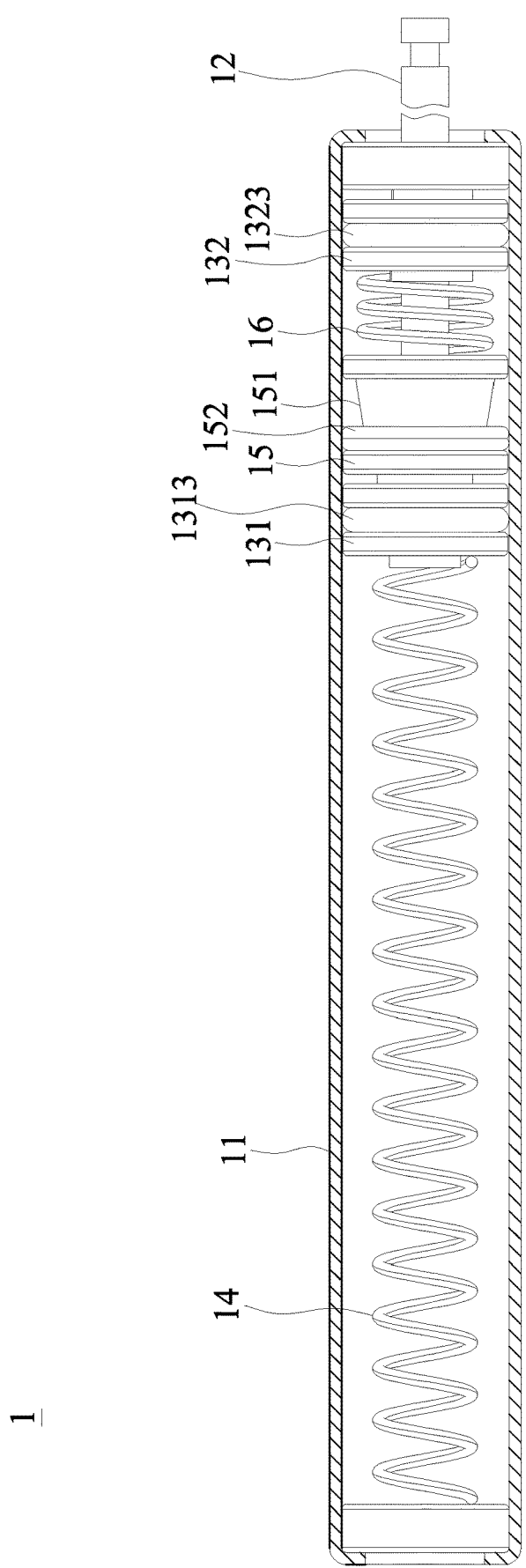
FIG. 6 is a third schematic view showing the status of the operation in accordance with a preferred embodiment of this disclosure.

With reference to FIGS. 1, 2 and 3 for the exploded view, perspective view and cross-sectional view of a variable damping shock absorber in accordance with a preferred embodiment of this disclosure respectively and FIGS. 4, 5 and 6 for the schematic views showing different statuses of an operation of the variable damping shock absorber in accordance with a preferred embodiment of this disclosure respectively, the variable damping shock absorber 1 includes a housing 11, a piston rod 12, two piston blocks 13, a first elastic element 14, a conical seat 15 and a second elastic element 16, and the variable damping shock absorber 1 is provided to be quickly installed into a slide rail (not shown in the figure) for buffering a force when the slide rail is forced to retract inward.

The housing 11 is a round tubular thin shell structure having two ends recessed inwards to form a ring rim 111 provided for installing two stop blocks 112, and each stop block 112 has a through hole 1121 formed at the center the stop block 112.

The piston rod 12 has two ends defined as a first end 121 and a second end 122 respectively, and the first end 121 is movably installed in the housing 11, and the second end 122 is extended and exposed from the housing 11 for the purpose of an external connection. It is noteworthy that the second end 122 passes through the through hole 1121 of one of the stop blocks 112, and the other stop block 112 is used for the purpose of ventilation.

The two piston blocks 13 include a first piston block 131 and a second piston block 132, and the first piston block 131 is disposed at the first end 121 of the piston rod 12, and the second piston block 132 is spaced from the piston rod 12 on a side of the first piston block 131, and a first piston rubber ring 1311 is installed between the first piston block 131 and the inner wall of the housing 11 to form an airtight seal, and a second piston rubber ring 1321 is installed between the second piston block 132 and the inner wall of the housing 11 to form an airtight seal. In addition, a first fixing hole 1312 is formed at the center of the first piston block 131 and configured to be corresponsive to the piston rod 12, and a second fixing hole 1322 is formed at the center of the second piston block 132 and configured to be corresponsive to the piston rod 12. In addition, a first ring groove 1313 is formed around the periphery of the first piston block 131 and configured to be corresponsive to the first piston rubber ring 1311, and a second ring groove 1323 is formed around the periphery of the second piston block 132 and configured to be corresponsive to the second piston rubber ring 1321.

The first elastic element 14 is installed between an end of the housing 11 and the first piston block 131, and the length of the first elastic element 14 is pre-pressed, which is equivalent to the length of the housing 11 minus the distance from the first piston block 131 to the second piston block 132, so that the piston rod 12 when not forced can be extended to the outside by the resilience of the first elastic element 14.

The conical seat 15 is movably installed between the first piston block 131 and the second piston block 132, and a conical surface 151 is formed at the middle part of the conical seat 15 and configured to be corresponsive to the moving direction of the piston rod 12, and the conical surface 151 is movably sheathed with a pair of third piston rubber rings 152, and the third piston rubber rings 152 can be moved on the conical surface 151 with the relative displacement of the piston rod 12. In addition, a penetrating hole 153 is formed at the center of the conical seat 15 and configured to be corresponsive to the piston rod 12, and two ends of the conical seat 15 have a ring retaining wall 154 configured to be corresponsive to the third piston rubber ring 152, such that the pair of third piston rubber rings 152 can only move between the two ring retaining walls 154. It is noteworthy that the conical surface 151 of the conical seat 15 has a predetermined included angle θ relative to the moving direction of the piston rod 12, and the predetermined included angle θ falls within a range of 60 degrees~75 degrees.

The second elastic element 16 is installed between the conical seat 15 and the second piston block 132, and the conical seat 15 abuts against the first piston block 131 by the resilience of the second elastic element 16, and the length of the second elastic element 16 is pre-pressed, which is equivalent to the spacing between the first piston block 131 and the second piston block 132 minus the length of the conical seat 15.

Therefore, when the variable damping shock absorber 1 of this disclosure is in a normal use and the second end of the piston rod is pressed, the first elastic element will be squeezed to produce a fixed damping effect. When the pressure exerted on the piston rod increases, the conical seat will increase friction due to the two third piston rubber rings moved to a position where a surface of the conical seat is closest to the inner surface of the housing inner surface to squeeze the inner surface of the housing, and provide a larger damping effect. After the applied pressure is released, the piston blocks and the conical seat restore their original positions by the resilience of the first elastic element and the second elastic element to achieve the effects of producing different damping effects under different strengths of the exerted pressure and meeting the actual operation requirements.

What is claimed is:

1. A variable damping shock absorber, provided to be quickly installed into a slide rail, for buffering when the slide rail retracts inward under a force, comprising:
   a housing, being a round tubular thin shell structure, and having two ends recessed inwards to form a ring rim provided for installing two stop blocks, and each of the stop blocks having a through hole formed at the center thereof;
   a piston rod, having two ends defined as a first end and a second end respectively, and the first end being movably installed in the housing, and the second end being extended to and exposed from the housing for purpose of an external connection;
   two piston blocks, including a first piston block and a second piston block, and the first piston block having the first end disposed at the piston rod, and the second piston block disposed on the piston rod and spaced apart from the first piston block, and a first piston rubber ring being installed between the first piston block and inner wall of the housing to form an airtight seal, and a second piston rubber ring being installed between the second piston block and the inner wall of the housing to form an airtight seal;
   a first elastic element, installed between an end of the housing and the first piston block, such that the piston rod when not being forced will be extended to the outside by resilience of the first elastic element;
   a conical seat, movably installed between the first piston block and the second piston block, and having a conical surface formed at middle part of the conical seat and corresponding to the moving direction of the piston rod, at least a third piston rubber ring movably sheathed on the conical surface, such that the third piston rubber ring moves on the conical surface with the relative displacement of the piston rod; and
   a second elastic element, installed between the conical seat and the second piston block, for abutting the conical seat against the first piston block by resilience of the second elastic element;
   thereby, when an exerted pressure increases, the third piston rubber ring moves to a position where a surface of the conical seat is closest to the inner surface of the housing, and squeezes the inner surface of the housing to increase friction and achieve the effect of enhancing a damping effect.

2. The variable damping shock absorber according to claim 1, wherein the length of the first elastic element is pre-pressed, wherein the pre-pressed length is equivalent to length of the housing minus the distance from the first piston block to the second piston block.

3. The variable damping shock absorber according to claim 1, wherein the length of the second elastic element is pre-pressed, wherein the pre-pressed length is equivalent to the spacing between the first piston block and the second piston block minus length of the conical seat.

4. The variable damping shock absorber according to claim 1, further comprising a first fixing hole formed at center of the first piston block and corresponding to the piston rod, a second fixing hole formed at a center of the second piston block and corresponding to the piston rod, a first ring groove formed around periphery of the first piston block and corresponding to the first piston rubber ring, and a second ring groove formed around periphery of the second piston block and corresponding to the second piston rubber ring.

5. The variable damping shock absorber according to claim 1, wherein the center of the conical seat has a penetrating hole corresponding to the piston rod, and two ends of the conical seat have a ring retaining wall corresponding to the third piston rubber ring, such that the third piston rubber ring only moves between the two ring retaining walls.

6. The variable damping shock absorber according to claim 5, wherein the conical surface of the conical seat has a predetermined included angle relative to the moving direction of the piston rod, and the predetermined included angle falls within a range of 60 degrees to 75 degrees.

* * * * *